(12) United States Patent
Bock (10) Patent No.: US 10,559,996 B2
(45) Date of Patent: Feb. 11, 2020

(54) BRUSH SYSTEM OF AN ELECTRIC MOTOR

(71) Applicant: Brose Fahrzeugteile GmbH & Co. Kommanditgesellschaft, Wuerzburg, Wuerzburg (DE)

(72) Inventor: Michael Bock, Waldbuettelbrunn (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 3 days.

(21) Appl. No.: 15/963,525

(22) Filed: Apr. 26, 2018

(65) Prior Publication Data

US 2018/0248441 A1 Aug. 30, 2018

Related U.S. Application Data

(63) Continuation of application No. PCT/EP2016/073492, filed on Sep. 30, 2016.

(30) Foreign Application Priority Data

Oct. 26, 2015 (DE) .................. 10 2015 220 897

(51) Int. Cl.
*H02K 13/00* (2006.01)
*H02K 5/14* (2006.01)
*H01R 39/38* (2006.01)

(52) U.S. Cl.
CPC ........... *H02K 5/148* (2013.01); *H01R 39/381* (2013.01)

(58) Field of Classification Search
CPC ............................. H02K 5/148; H01R 39/381
USPC .................................................. 310/239, 244
See application file for complete search history.

(56) References Cited

U.S. PATENT DOCUMENTS

| 4,596,941 A * | 6/1986 | Kluck | H01R 39/42 310/239 |
| 4,868,441 A | 9/1989 | Bulick | |
| 2004/0245886 A1 * | 12/2004 | Uchida | H01R 39/59 310/239 |
| 2012/0062067 A1 * | 3/2012 | Shim | H02K 5/148 310/239 |

FOREIGN PATENT DOCUMENTS

| CN | 1193419 A | 9/1998 |
| DE | 21 57 596 A1 | 5/1973 |
| EP | 1324439 A2 | 7/2003 |
| GB | 1379145 A | 1/1975 |

(Continued)

OTHER PUBLICATIONS

International Search Report dated Sep. 12, 2016 of application PCT/EP2016/073492 on which this application is based.

*Primary Examiner* — Hanh N Nguyen
(74) *Attorney, Agent, or Firm* — Muncy, Geissler, Olds & Lowe, P.C.

(57) ABSTRACT

A brush system of an electric motor, having a commutator, at least one brush that is guided within a brush duct and is provided with a connection line, and a spring element that exerts a spring force on the brush when the spring element is effectively connected thereto, such that the brush rests against the commutator; the brush duct includes a longitudinal duct slot inside which the connection line extends and which has a constriction that the connection line penetrates when the effective connection between the spring element and the brush is established.

10 Claims, 4 Drawing Sheets

(56) References Cited

FOREIGN PATENT DOCUMENTS

| JP | 200404957 A | 2/2004 |
| JP | 2008172942 A | 7/2008 |
| WO | WO9701878 A1 | 1/1997 |

\* cited by examiner

BRUSH SYSTEM OF AN ELECTRIC MOTOR

This nonprovisional application is a continuation of International Application No. PCT/EP2016/073492, which was filed on Sep. 30, 2016, and which claims priority to German Patent Application No. 10 2015 220 897.4, which was filed in Germany on Oct. 26, 2015, and which are both herein incorporated by reference.

BACKGROUND OF THE INVENTION

Field of the Invention

The present invention relates to a brush system of an electric motor with a commutator, with at least one brush guided in a brush duct and having a connecting line, and with a spring element that, in its operative connection with the brush, exerts a spring force thereon to place it against the commutator. The invention additionally relates to an electric motor with a brush system of this nature.

Description of the Background Art

Motor vehicles today normally have a number of adjustment parts, for example a seat adjustor, an actuatable lock, window regulators, and/or an adjustable sunroof, which can be moved between different adjustment positions by means of a relevant associated electric-motor driven positioning drive. The applicable adjustment part is operated by means of a transmission driven by a DC motor or electric motor, for example in the form of a worm gear drive with a worm (on the driven side) on the motor shaft and a worm wheel (on the driving side). Customarily the transmission is arranged in a transmission housing to which the electric motor is flange-mounted by means of its motor housing. Normally the electric motor is fastened to the transmission housing at its end face, wherein a stub axle, which is to say the shaft end of the motor shaft of the electric motor carrying the transmission part on the driven side (worm on the shaft end), projects into the transmission housing.

Also located at the end face of the electric motor are plug contacts, which are electrically connected to corresponding mating contacts arranged in the transmission housing. The plug contacts are arranged in a positive locking manner in a brush system—customarily made of plastic—of the electric motor that preferably is implemented as a commutator motor with the commutator on the rotor side, and are secured by structures to prevent slipping or displacement. The structures of the plug contacts may be designed with a sawtooth or Christmas-tree shape, and by means of the teeth, which act as barbs, prevent displacement of the plug contacts during assembly as well as during operation of the drive. During manufacture of the electric motor, the plug contacts are coated with the plastic of the body, and the positive locking connection between the two is established in this way.

Unlike a brushless electric motor, in an electric motor equipped with a commutator that is fixed to the shaft, normally two, or even more, brushes sweep over a number of commutator segments, which transmit the electric current to the windings of a rotor that rotates with the motor shaft. By means of the segments, a commutation is created from winding to winding that creates a torque on the motor shaft (rotor shaft) with respect to magnetic poles of the stator, which typically are stationary. In this design, the plug contacts are connected to the brushes in an electrically conductive manner by means of stranded connecting lines.

The brushes are customarily rectangular solid bars pressed from carbon powder, if applicable together with metal particles. Because of the sliding contact with the commutator segments, the brushes are subject to abrasion during operation of the electric motor. In order to maintain the contact between brush and commutator despite the abrasion, the brushes generally are mounted in a tubular brush duct such that they are movable by means of mechanical springs under the action of their spring force so that automatic readjustment of the brushes takes place. The spring force can be created by means of leg springs, compression springs, leaf springs, or coiled band springs, for example.

The applicable brush duct is often arranged on a carrier (brush holder) implemented as, e.g., a brush plate, that, together with the brushes and the requisite electrical contact and any interference suppression components (coils, chokes, capacitors) that may be present, forms the so-called brush system.

During assembly of the electric motor, it is necessary when mounting the—usefully ring-shaped—brush system on the commutator to push in the colliding brushes in opposition to the spring force of the springs and to hold them back in the brush duct in such a manner that the commutator can be guided through a central opening of the brush system without colliding with the brushes. The risk of edge breakage exists for the brushes in the event of a collision, as a result of which the commutator segments may occasionally not be uniformly swept or contacted during operation.

To hold back the brushes, retaining rings are known, for example, that keep the necessary guide or joining space of the commutator clear during assembly. However, such retaining rings must be inserted as additional components before assembly of the motor and then must be removed again after assembly, making the assembly of the electric motor especially time-consuming and cost-intensive.

Alternatively, it is likewise possible for the brushes, especially in combination with a leg spring, to be assembled in the brush duct without additional components to hold them back. For this purpose the brushes typically have additional grooves and/or retaining contours that interact with mating contours on the duct side to limit an insertion path of the brushes. By this means, the brushes are, for example, wedged in the brush duct and prevented from slipping. In disadvantageous manner, a relatively complicated and thus cost-intensive (carbon) pressing tool is required for manufacturing such brushes.

It is known from JP 2008-172 942 A to hold the brush pressure springs in a standby position in order to keep the applicable brush in a position that does not impinge on the commutator for a period of time or as needed.

DE 21 57 596 A1 discloses a stop in the guide slot of a brush holder for a stranded contact wire of a brush impinged on by a compression spring. The stop is formed by a narrowing of the guide slot at the slot end (slot exit) of the guide slot facing a planar commutator of a motor armature. This design is intended to prevent the brush from being able to be forced completely out of the brush holder as a result of the continuously acting spring force of the compression spring.

It is known from U.S. Pat. No. 4,868,441 to design the guide slot for the stranded brush wire in the brush holder with an L-shape. In this design, the short, tangential leg of the L serves as a stop position of the brush in its retracted (withdrawn) position in the brush holder, wherein in the retracted state of the brush the stranded brush wire engages behind a transition edge between the two legs of the L of the guide slot, and sits in the comparatively short leg of the L of the guide slot. Since this short leg of the L is perpendicular to the radial leg of the L of the guide slot, the brush remains in a preliminary position despite the action of the spring force of the brush spring. To activate the brush function, the stranded brush wire must be raised over the transition edge by appropriate manipulation (manually) and brought into the radial leg of the L of the guide slot.

SUMMARY OF THE INVENTION

It is therefore an object of the invention to provide an especially suitable brush system of an electric motor that advantageously is comparatively easy to install. The invention has the additional object of specifying an electric motor with such a brush system that is as easy and economical to manufacture as possible.

The brush system according to an exemplary embodiment of the invention for an electric motor has at least one brush, which is made of compressed carbon powder, for example, and to which a flexible, stranded connecting line is connected or preferably is integrated into the brush. A spring element is in operative connection with the brush, wherein the spring element exerts a spring force on the brush. As a result, the brush is moved, wherein it is usefully guided in a tubular brush duct.

The connecting line to the brush is suitably guided in a longitudinal duct slot of the associated brush duct. The longitudinal duct slot suitably extends radially with respect to the rotor axis or motor axis. The direction of motion or direction of brush pressure of the brush in this case is toward a spot where a commutator is located in the assembled state of the electric motor. In other words, during operation of the electric motor the brush is pressed against the commutator by means of the spring element to form a sliding contact. Consequently, the commutator is in electrical contact with the brush, and in particular with the connecting line, permitting a flow of electric current to power a rotor that includes the commutator.

The longitudinal duct slot has a constriction through which the connecting line passes when the operative connection of the spring element with the brush is established. The constriction in this design is located in particular at a point along the longitudinal duct slot where the brush that is connected to the connecting line does not project into a joining space of the brush system before it passes through the constriction, or does not collide with the commutator during installation thereof.

Assembly of the brush system and of the electric motor is simplified by the constriction in the longitudinal duct slot. For example, the brush that is connected to the connecting line is introduced into the brush duct and the spring element is assembled. In a subsequent step, the commutator is assembled as intended, wherein the constriction holds the connecting line, and thus the brush, out of the joining space of the commutator. The joining space here is, in particular, a central recess in the brush system. As a result, the brush does not adversely affect assembly, since it cannot occupy the future space of the commutator on account of the constriction. Furthermore, the risk of edge breakage of the brushes due to a collision with the commutator is avoided by a simple design.

Not until the commutator is brought into its final position is the operative connection with the spring element established so that its spring force is exerted on the brush in the direction of the commutator. In this process the connecting line is pushed through the constriction, causing the connecting line to pass through the constriction and the brush to be transferred to a position that contacts the commutator.

The brush duct at least partially forms a positive-locking receptacle for the brush, within which the brush is radially movable toward the commutator with respect to a motor shaft or rotor shaft of the electric motor. The brush duct is designed, for example, as a hollow cylinder with an essentially rectangular cross-section. A loose fit is suitably created between the brush duct and the brush so that the brush is guided relatively securely and wedging is avoided. As a result, friction is also comparatively low.

The connecting line is pressed into the brush, for example, or preferably is introduced into the brush by means of a bore and subsequent gluing. In other words, the connecting line is in particular joined to the brush projecting perpendicularly to the direction of brush pressure. The connecting line passes through the longitudinal duct slot of the brush duct, simplifying guidance of the brush.

The brush duct is suitably U-shaped and is oriented along the radial direction, wherein a slot opening of the longitudinal duct slot faces, in particular, toward an outer circumference of the brush system, which is to say toward a side facing away from the commutator. In particular, the connecting line thus defines a limit stop of the brush at the horizontal leg of the U of the longitudinal duct slot. This prevents the brush from sliding through the brush duct.

In other words, retention of the brush that is simple in design and economical is created through the interaction of the longitudinal duct slot, the constriction, and the connecting line. In contrast to the prior art, this eliminates not only additional parts (retaining ring) but also shaping of the brush. The brush is thus preferably cuboid in design, as a result of which an especially simple pressing tool can be used to manufacture the brush. This carries over to the manufacturing costs of the electric motor advantageously.

The spring element (mechanical spring) is expediently in direct mechanical contact with the brush, and preferably is suitable and equipped to compensate for abrasion of the brush caused by operation, which is to say a shortening of the brush caused by abrasive wear. The spring element thus feeds the brush in the brush duct in the direction of brush pressure. In this context, the rate of abrasion of the brush is slow in comparison with the rotational speed of the commutator. In order to be able to follow the shortening of the brush over its service life, the spring element or its spring arm that interacts with the brush preferably has a spring travel corresponding to the length of the brush.

In a suitable improvement, the spring element is in particular a leg spring or torsion spring. The leg spring has a cylindrical center part shaped in the manner of a helix. The ends of the helix, which preferably project tangentially, each transition to a lever-like spring leg extending essentially radially. In this design, the two spring legs are moved to a preferred angular position relative to one another on account of the center part. The leg spring is preferably produced as a single piece from an elastic material, for example from spring steel. The orientation of the pivot axis, which is to say the axial axis of the center part, is in particular perpendicular to the brush. The center part is placed on a pivot formed as a bearing on a brush plate outside the brush duct. An especially space-saving arrangement on the brush plate of the brush system is realized by this means.

In an embodiment, one of the spring legs is fixed to or supported on the brush plate, in contrast to which the remaining spring leg is movable. The movable spring leg, hereinafter also referred to as the pressure leg, can be moved from a rest position to a pressure position on the brush that establishes the operative connection, wherein the free end of the pressure leg rests at least partially on the brush in the pressure position. In other words, the leg spring in the pressure position is in direct mechanical contact, and thus in operative connection, with the brush. In this design, the pressure position is located, in particular, at a narrow side of the brush facing away from the commutator.

The spring leg of the leg spring in this design rests against the brush under mechanical preloading caused by the spring such that a radial force component acts as a result of the pressure position or pressure surface oriented parallel to a contact surface on the commutator side. The radial force component causes the brush to be pressed against the commutator as a result of the brush abrasion resulting from operation, and thus causes a movement of the brush along a radial adjustment path or wear path (spring travel) toward the commutator.

In an embodiment, the pressure leg is a leg of a free end of the spring element bent into a U shape, in particular in an embodiment of the spring element as a leg spring. Because of the bend, the (pressure) leg resting against the brush is angled or rounded, wherein the rounding in particular preferably rests against the brush in the pressure position. In this way, snagging or damaging of the brush by the spring element is avoided by a simple design.

In an embodiment, the spring element, in particular its pressure leg, in operative connection with the brush is guided in a guide slot in a side wall of the brush duct that extends in the direction of brush pressure. This permits a comparatively compact construction of the brush plate, wherein the movement of the brush takes place only in the desired direction.

In an embodiment, the side duct wall of the brush duct has a retaining contour in which the pressure leg of the spring element is held in the rest position. In the rest position, no spring pressure acts on the brush, wherein the pressure leg in the retaining contour preferably secures the brush against slipping out of the brush duct. As a result, the brush is preferably held in a position inside the brush duct between the pressure leg at the end face of the brush duct and the constriction of the longitudinal duct slot when the spring element is in the rest position. In other words, the displacement travel of the enclosed brush is delimited on the one hand by the pressure leg located at the end face, and on the other hand by the constriction incorporated along the longitudinal duct slot because of the attached connecting line, wherein the brush is preferably located essentially completely inside the brush duct when in such a "hold position." Especially easy assembly of the electric motor is ensured by this means.

The pressure leg can be held in the rest position by the retaining contour for assembly of the commutator. After a positioning of the commutator the spring element is activated, which means that the pressure leg is displaced from the retaining contour into the guide slot so that the operative connection is established. Driven by the spring force, the connecting line passes through the constriction, and electrical contact between the brush and the commutator is made possible. In other words, the retaining contour serves to secure or latch the movable pressure leg so that the brush is not subjected to a spring force. Thus, it is possible for example to completely assemble the brush system while the pressure leg is held in the rest position. After the electric motor is essentially completely assembled, the pressure leg is activated or released and the spring force is exerted on the brush.

In an embodiment, the constriction can be formed by local edge bulges of the slot edges that project into the longitudinal duct slot on both sides thereof. In this connection, edge bulges are in particular to be understood to mean bulges of material at the slot edges that cause an hourglass-like or necked narrowing or tapering of the clear width of the longitudinal duct slot. As a result of the bulges on both sides, the connecting line is guided in a centered manner, which advantageously avoids the danger of unwanted bending or deformation of the connecting line and resulting damage thereto. Furthermore, the edge bulges result in an especially simple design of the constriction, the clear width of which is preferably matched to the diameter of the connecting line. To this end, the edge bulges are designed in particular with no sharp edges, preferably with roundings, so that the connecting line is not damaged while passing through.

In an advantageous embodiment, the clear width of the constriction can be at least slightly smaller than or equal to the diameter of the connecting line. The essentially equal dimension of the constriction and the connecting line, or of the clear width and the diameter, ensures on the one hand that the connecting line cannot pass through the constriction of its own accord when this is not wanted, which is to say in particular in the rest position of the pressure leg. On the other hand, when there is an operative connection of the leg spring and the brush, it is ensured that the connecting line can pass through the constriction without problems, so the risk of clamping (wedging) of the connecting line within the constriction is prevented. Since the connecting line preferably passes through the constriction only once, in particular after essentially complete assembly of the electric motor, damage to or fanning out of the preferably stranded connecting line is avoided.

In an embodiment, the longitudinal duct slot can be located on a top duct side of the brush duct facing away from the brush plate. In other words, the connecting line runs at least partially in the axial direction with respect to the motor shaft, by which means simple line routing is achieved and additional installation space is provided on the brush plate outside the brush duct for the spring element.

In an embodiment, the brush system can be installed in an electric motor. Through the use of a brush system according to the invention, assembly of the motor is simplified, ensuring especially simple and economical manufacture of the electric motor. The electric motor is preferably part of a positioning drive of a motor vehicle. The positioning drive, which is a window regulator for example, has, e.g., a transmission that is in operative connection with an adjustment part (window). The transmission itself is driven by means of the electric motor.

The brush holder in this design expediently can include two or more brushes, which in particular are located on opposite sides of the commutator with point symmetry to the same. This simplifies assembly and, moreover, requires less space. Furthermore, the weight distribution of the electric motor is balanced as a result.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Figure 1:
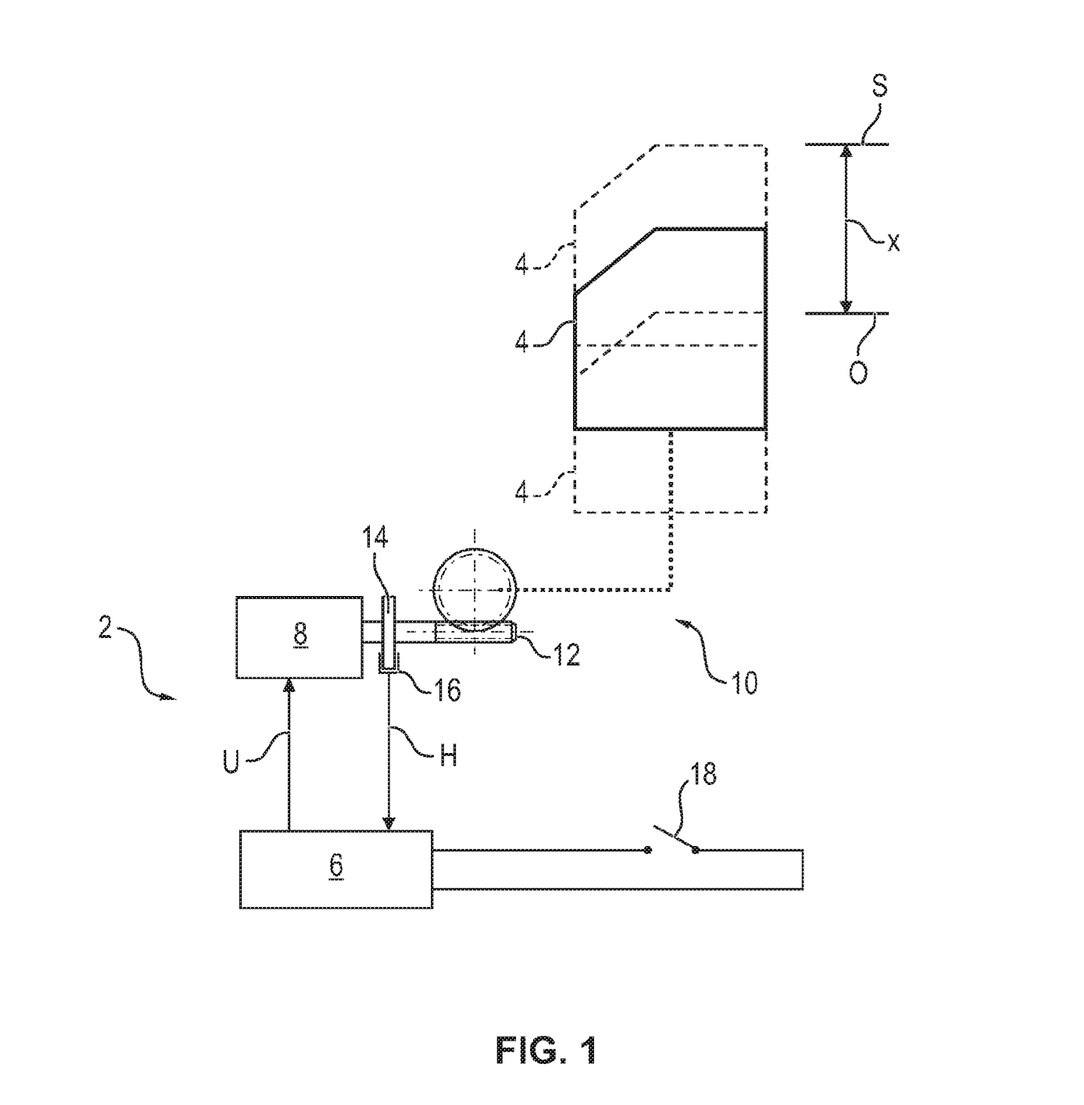
FIG. 1 is in schematic representation, a window regulator as a positioning drive of a vehicle window, with an electric motor and with an actuating mechanism coupled therewith by a drive.

The positioning drive 2 shown in FIG. 1 is an electric window regulator for a window pane 4 of a motor vehicle. The positioning drive 2 is suitably integrated into a vehicle door of the motor vehicle for this purpose. The positioning drive 2 includes a control unit 6 for driving, by a signal, an actuating motor 8, which acts on the window pane 4 through an actuating mechanism 10. The actuating mechanism 10 can be implemented, e.g., in the form of a double-guided cable window regulator or as a cross-arm window regulator. It includes, in particular, a motor shaft 12.

The control unit 6 in this embodiment is at least substantially composed of a microcontroller with control and analysis software implemented on it. Preferably, pinch protection is integrated in the control unit 6; this pinch protection prevents the window pane 4 from jamming an object located in the adjustment path.

When the actuating motor 8, also referred to hereinafter as the electric motor, is actuated, the window pane 4 is moved in its (window) position x. The window pane 4 here can be reversibly moved between a closed position S that represents the highest possible position x and an open position O that represents the lowest possible position x. The window pane 4 is indicated with dashed lines in each of these positions S and O in FIG. 1. In contrast, the window pane 4 is shown in solid lines in a half-open intermediate position. The height of the top window pane edge is chosen as the reference point for the position x in FIG. 1 by way of example.

To determine the current position x of the window pane 4 in a given case, a ring magnet 14 having an even number of circumferentially distributed magnetic poles is arranged on the motor shaft 12. A Hall effect sensor 16 that serves as a position transmitter works together with the ring magnet 14. When the motor shaft 12 rotates, the Hall effect sensor 16 detects the fluctuating magnetic field of the ring magnet 14 as a result of the magnetic poles moving past the Hall effect sensor 16, and generates a correspondingly pulsating Hall signal H, which it outputs to the control unit 6. By counting and summing the pulses of the Hall signal H, the control unit 6 determines a measure of position, which under normal operating conditions is proportional to the actual position x of the window pane 4.

A normal actuation process, in which the window pane 4 is to be moved from its closed position S toward the open position O, is initiated by a vehicle user by operating a pushbutton 18 located on a door trim panel, for example. In this case, an actuating signal is sent by the pushbutton 18 to the control unit 6, on the basis of which the control unit 6 drives the electric motor 8 by applying a motor voltage U in an opening actuation direction.

Figure 2:
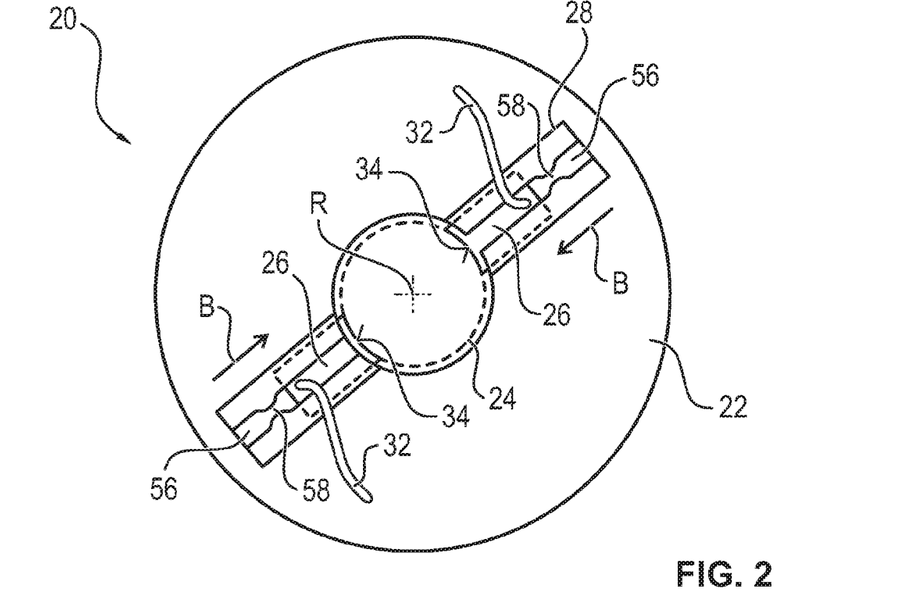
FIG. 2 is in a schematic top view, a representation of a brush system of the electric motor with brushes located opposite one another, each of which is supported in a brush duct so as to be spring-loaded against a commutator.

The electric motor 8, implemented in particular as a commutator motor, has a brush system 20 shown schematically in FIG. 2. The brush system 20 includes an approximately annular brush plate 22, which is arranged concentrically around a commutator 24 of the electric motor 8 that is fixed to the motor shaft 12. The brush system 20 also includes two brushes 26, which are in electrically conductive contact with the commutator 24 during operation in the manner of sliding contacts. During operation, the motor shaft (rotor shaft) 12, and thus the commutator 24, rotates about the common axis of rotation R, which is illustrated in FIG. 2 as a cross.

In addition, the brush system 20 includes two brush ducts 28, located opposite one another and offset radially by 180° with respect to the axis of rotation R of the motor shaft 12 in the exemplary embodiment, in which the brushes 26 are guided so as to be radially movable. In other words, the brushes 26 and the respective associated brush duct 28 are arranged on the brush plate 22 with point symmetry relative to the motor shaft 12 or the commutator 24.

In order to create contact pressure between the brushes 26 and the commutator 24 along a radially oriented direction of brush pressure B, the brush system 20 has an associated spring element 30 for each brush 26.

Figure 3:
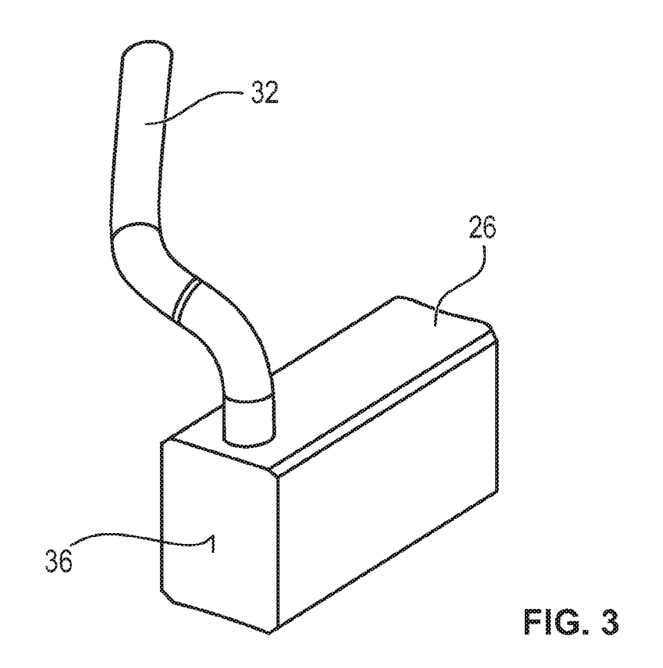
FIG. 3 is in a perspective representation, a brush with an integrated connecting line.

The brushes 26 serve to supply current to the commutator 24, which rotates during operation, and thus to the windings of a rotor of the electric motor 8. As is evident in particular from FIG. 3, the brushes 26 each have an integrated connecting line 32, also called a carbon cable, on a top side facing away from the brush plate 22 for transmission of current. The connecting line 32 is electrically connected to the control unit 6 of the electric motor 8 through a plug contact.

Figure 4:
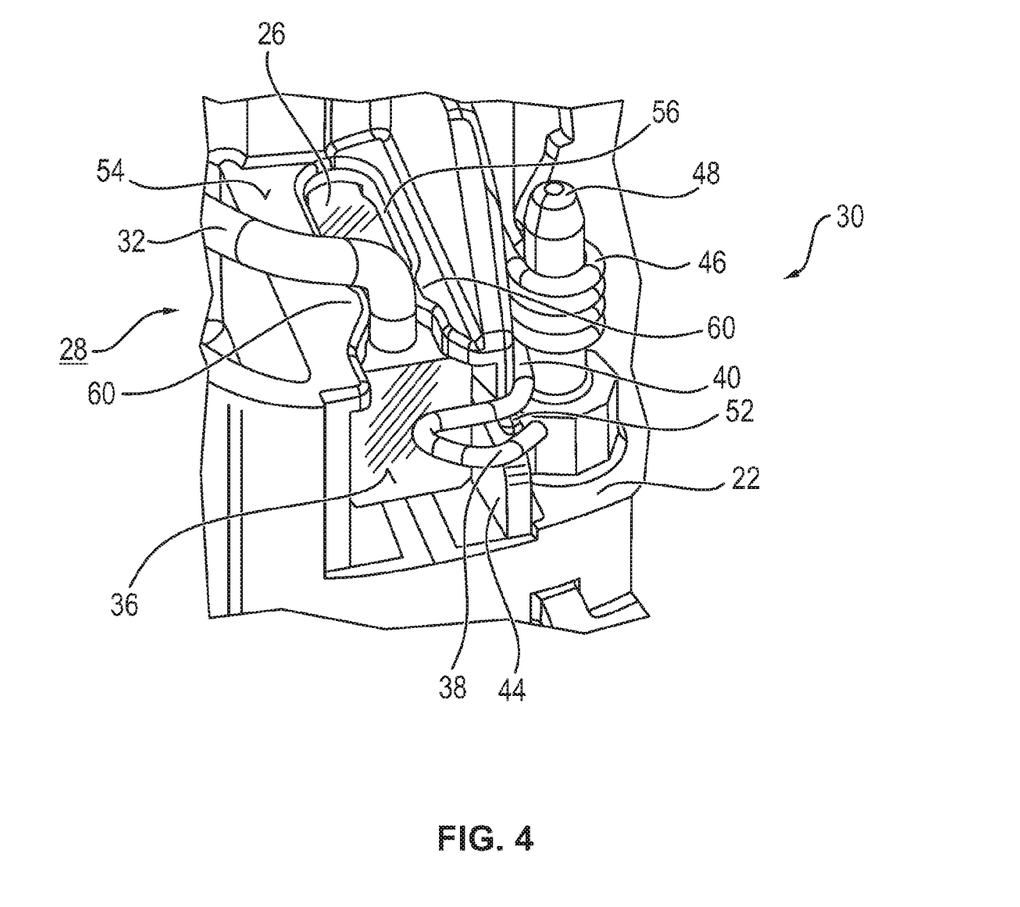
FIG. 4 is in a perspective representation, the brush in the brush duct with a spring leg of the spring element in contact.
Figure 5A:
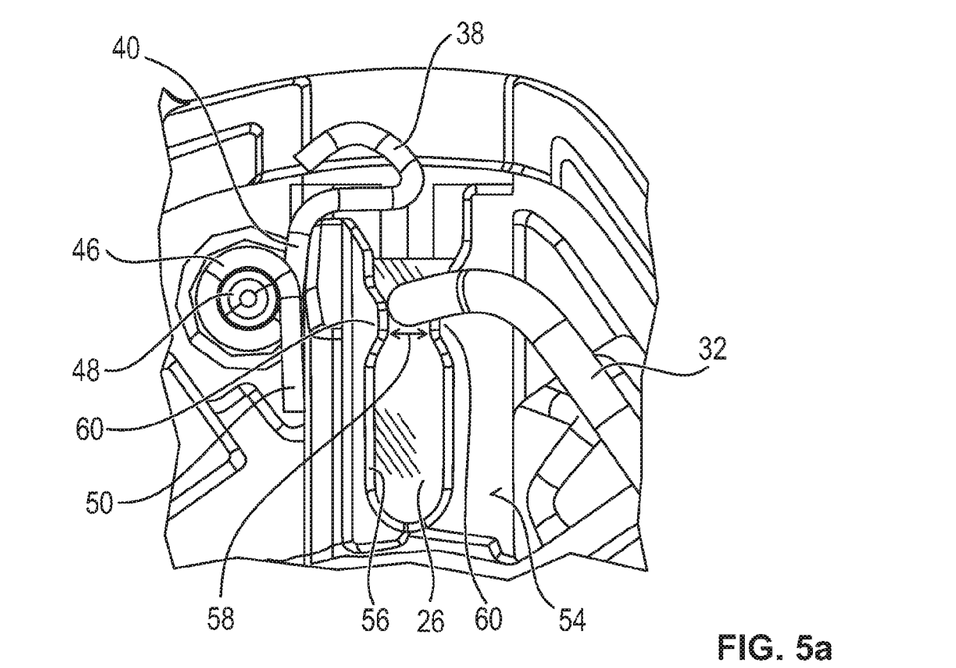
FIGS. 5a and 5b are, in a top view, the brush in the brush duct and the spring element for various pivot positions of the spring leg.
Figure 5B:
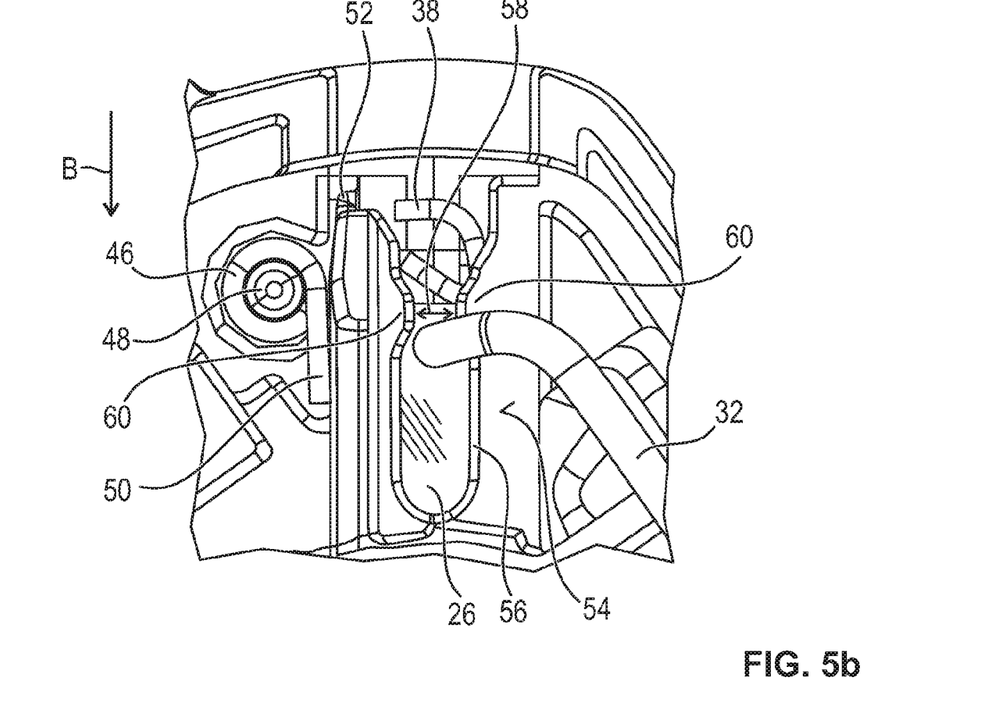

Sections of the brush plate 22 in the region of a brush duct 28 are shown in FIG. 4 as well as in FIGS. 5a and 5b. The brush ducts 28 are formed onto the brush plate 22, and are designed in particular in the manner of radially extending hollow cylinders with a rectangular cross-section for essentially positively receiving the brushes 26 that are guided in a sliding manner in the brush duct 28. An approximately cuboid brush 26 is located inside each brush duct 28, wherein a contact surface 34 located on the radially inward side of the brush 26 is rounded in a manner complementary to an outer contour of the commutator 24.

The brush 26 is pressed from carbon powder, wherein the end face opposite the contact surface 34 forms a pressure surface 36 on which a rounded, U-shaped pressure leg 38 as the free end of a (spring) leg 40 of the spring element 30 rests when an operative connection is present. In this case, the rounding of the U-shaped pressure leg 38 is in direct mechanical contact with the brush 26. The pressure leg 38 is formed onto the leg 40 approximately in the shape of an L, wherein the leg 40 forms in particular the vertical leg of the L, and the pressure leg 38, or one of the vertical legs of its U shape, forms in particular the horizontal leg of the L.

In the state in which the operative connection is present, the leg 40 is located at least partially inside a radially extending guide slot 42 of the brush duct 28. The guide slot 42 is integrated into a side duct wall 44 of the brush duct 28 that is essentially perpendicular to the brush plate 22 and the end faces 34, 36.

The spring element 30 in the form of a rotary spring, also referred to hereinafter as the leg spring, has a center part 46 connected to the leg 40 that is positioned outside the brush duct 28 on the brush plate 22. The helical center part 46 comprises a number of windings that are arranged around a cylindrical pivot 48 as bearing point. The pivot 48, which is arranged parallel to the motor shaft 12, is formed onto the brush plate 22 as a single piece or monolithically. The windings of the center part 46 transition into a second free end—hereinafter referred to as spring arm or support 50—that is fixed to or supported on the brush plate 22. As is evident in particular in FIG. 5a and FIG. 5b, the support 50 rests in particular on the outer region of the duct wall 44.

Consequently, the center part 46 is held in an essentially rotationally fixed manner by means of the support 50, so that a tensioning of the leg spring 30 and a resulting pivoting of the leg 40 radially outward about a pivot axis defined by the pivot 48 causes a (spring) force that acts radially to the inside, which is to say is directed toward the commutator 24, to be applied to the brush 26. The pivot axis here is parallel to the motor shaft 12 and perpendicular to the extension of the brush 26.

During operation of the electric motor 8, each brush 26 is eroded due to the sliding contact with the commutator 24 and is thus reduced in length. As long as the brush 26 does not rest against the commutator 24, it presents no significant resistance to the pressure leg 38, as a result of which the brush 26 is pushed along the direction of brush pressure B inside the brush duct 28, as indicated in FIG. 2. The movement is not interrupted until the applicable contact surface 34 of the brush 26 rests with frictional connection against the outer circumference of the commutator 24. During this process the leg spring 30 is at least partially relaxed.

The brush duct 28 has an approximately lug-like or cam-like projection as a retaining contour 52 facing toward the outer circumference of the brush plate 22 on the duct wall 44 that carries the guide slot 42. In relation to the brush plate 22, the retaining contour 52 in this design is located axially above the guide slot 42, which is open toward the outer circumference. As is especially evident in FIG. 4 and in FIG. 5a, the leg 40 of the leg spring 30 can be secured, and thus held in a rest position, with the pressure leg 38 on the end face of the brush duct 28 by means of the retaining contour 52. Consequently, no spring force is exerted on the brush 26 in the rest position, wherein the pressure leg 38 at least partially projects beyond the opening at the end face of the brush duct 28. In this way, the brush 26 is prevented from sliding out of the brush duct 28 toward the outer circumference of the brush plate 22.

To ensure operationally reliable, non-wedging guidance of the brush 26 in the brush duct 28, the brush duct 28 has a longitudinal duct slot 56 on a top duct side 54 for guiding the connecting line 32. In this design, the top duct side 54 is located on the side of the brush duct 28 opposite the brush plate 22. The longitudinal duct slot 56 is expediently U-shaped and is oriented along the radial direction or direction of brush pressure B, wherein a slot opening of the longitudinal duct slot 56 is oriented toward the outer circumference of the brush plate 22.

Approximately one-third of the way along its length starting from the slot opening, the longitudinal duct slot 56 has a constriction 58 that reduces the clear width of the longitudinal duct slot 56 in an hourglass shape. The constriction 58 is formed by two edge bulges 60 that project into the longitudinal duct slot 56 from the slot edges on both sides. The edge bulges 60 are, in particular, rounded bulges of material at the slot edges. The clear width of the constriction 58 in this design preferably is approximately equal to the (outer) diameter of the connecting line 32.

During assembly of the electric motor 8, the brushes 26 are first inserted into the respective brush ducts 28 in the brush system 20, and the respective line 32 is guided into the associated longitudinal duct slot 56. In a subsequent step, the leg springs 30 are placed onto the pivots 48 and the pressure legs 38 are placed in the retaining contours 52 in the rest position. Each brush 26 is thus secured against slipping out toward the inner or outer circumference of the brush plate 22 by the constriction 58 on one side and by the pressure leg 38 on the other side.

In particular, the essentially equal dimension of the clear width of the constriction 58 and of the diameter of the connecting line 32 ensures that the brush 26 cannot pass through the constriction 58 of its own accord. As a result, the central recess of the brush plate 22 is kept clear so that the commutator 24 or the rotor of the electric motor 8 that carries it can easily be inserted and assembled. In other words, the brushes 26 do not adversely affect assembly, since they cannot occupy the future space of the commutator 24 on account of the applicable constriction 58.

When the commutator 24 is brought into its final position, the pressure legs 38 are displaced from the retaining contours 52 into the guide slots 42. As a result, the pressure legs 38 are in a pressure position on the pressure surfaces 36 of the brushes 26, so that an operative connection is established. As a result, a spring force is exerted on the brushes 26 along the direction of brush pressure B, as a result of which the connecting line 32 is pushed through the constriction 58, and thus passes through the constriction 58. After passage through the applicable constriction 58, the brushes 26 with their associated contact surfaces 34 are pressed against the commutator 24 in a functional manner.

The invention is not limited to the exemplary embodiment described above. Instead, other variants of the invention can be derived therefrom by the person skilled in the art without departing from the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A brush system of an electric motor comprising:
   a commutator;
   at least one brush guided in a brush duct; and
   a connecting line; and
   a spring element that, in an operative connection with the brush, exerts a spring force thereon to place the brush against the commutator,
   wherein the brush duct has a longitudinal duct slot guiding the connecting line, and
   wherein the longitudinal duct slot of the brush duct has a constriction through which the connecting line passes when the operative connection of the spring element with the brush is established.

2. The brush system according to claim 1, wherein the spring element is a leg spring that is placed on a pivot formed outside the brush duct on a brush plate.

3. The brush system according to claim 1, wherein the spring element has one fixed spring leg and one movable pressure leg that is moveable from a rest position to a pressure position on the brush that establishes the operative connection.

4. The brush system according to claim 3, wherein the pressure leg is a leg of a free end of the spring element bent into a U-shape.

5. The brush system according to claim 1, wherein the spring element, in operative connection with the brush, is guided in a guide slot extending in a direction of brush pressure in a side duct wall of the brush duct.

6. The brush system according to claim 1, wherein the constriction is formed by edge bulges on both sides of the longitudinal duct slot that project into the same.

7. The brush system according to claim 1, wherein a clear width of the constriction is at least slightly smaller than or is equal to a diameter of the connecting line.

8. The brush system according to claim 1, wherein the longitudinal duct slot is located on a top duct side of the brush duct facing away from a brush plate.

9. An electric motor comprising a brush system according to claim 1.

10. A brush system of an electric motor comprising:
a commutator;
at least one brush guided in a brush duct; and
a connecting line; and
a spring element that, in an operative connection with the brush, exerts a spring force thereon to place the brush against the commutator,
wherein the brush duct has a longitudinal duct slot guiding the connecting line, and
wherein the brush duct has a constriction through which the connecting line passes when the operative connection of the spring element with the brush is established,
wherein the spring element, in operative connection with the brush, is guided in a guide slot extending in a direction of brush pressure in a side duct wall of the brush duct, and
wherein the side duct wall of the brush duct has a retaining contour in which a pressure leg of the spring element is held in the rest position.

* * * * *